United States Patent [19]
Koyama et al.

[11] Patent Number: 5,476,022
[45] Date of Patent: Dec. 19, 1995

[54] STEERING WHEEL CORE WITH IMPROVED SPOKE

[75] Inventors: Toru Koyama; Atsushi Nagata, both of Aichi, Japan

[73] Assignee: Toyoda Gosei Co., Ltd., Nishikasugai, Japan

[21] Appl. No.: 203,352

[22] Filed: Mar. 1, 1994

[30] Foreign Application Priority Data

Mar. 2, 1993 [JP] Japan .................................. 5-041354

[51] Int. Cl.⁶ ................................................ B62D 1/11
[52] U.S. Cl. ........................................... 74/552; 280/777
[58] Field of Search ...................... 74/552, 558; 280/777

[56] References Cited

U.S. PATENT DOCUMENTS

| | | | |
|---|---|---|---|
| 4,448,091 | 5/1984 | Bauer et al. | 74/552 |
| 4,468,978 | 9/1984 | Takahara et al. | 74/552 |
| 4,738,157 | 4/1988 | Nishijima et al. | 74/552 |
| 5,085,097 | 2/1992 | Harata et al. | 74/552 |
| 5,244,230 | 9/1993 | Komiya et al. | 280/777 |

FOREIGN PATENT DOCUMENTS 2346195  10/1977  France ..................................... 74/552

*Primary Examiner*—Richard M. Lorence
*Attorney, Agent, or Firm*—Cushman Darby & Cushman

[57] ABSTRACT

A steering wheel core is provided including a boss, a ring and a spoke. The spoke is composed of a cover member having predetermined rigidity, and a flexible insert embedded in the cover member. The insert is formed with a bent portion. The cover member has a reduced thickness portion near the bent portion of the insert. Due to the reduced thickness portion, the cover member has a lower strength near the bent portion than that of remaining portions thereof. As a result, the cover member ruptures near the bent portion if an impact is applied to the steering wheel, so that the spoke is deformed to absorb the impact. However, the spoke will not rupture completely due to the insert flexing at its bent portion.

16 Claims, 5 Drawing Sheets

STEERING WHEEL CORE WITH IMPROVED SPOKE

The priority application, Japanese Patent Application No. 05-041354 filed in Japan on Mar. 2, 1993, is hereby incorporated hereinto by this reference.

BACKGROUND OF THE INVENTION

1. Field of the Invention

The present invention relates to a steering wheel core for a vehicle and, more particularly, to a steering wheel core including a ring and a boss connected to each other by spokes which are constructed to absorb an impact applied thereto.

2. Description of Related Art

A conventional steering wheel having a core is disclosed in U.S. Pat. No. 5,085,097. As shown in FIG. 9, a core 31 includes a ring 32, a boss 33 about which the steering wheel is rotated, and spokes 34 connecting the ring 32 and the boss 33. The ring 32 and the spokes 34 are made of materials having sufficient strengths and rigidities. The core 31 so constructed ensures a strong and rigid steering wheel. In ordinary use, therefore, the steering wheel does not deform due to stresses applied thereto.

As noted above, the conventional core 31, including the ring 32 and the spoke 34 is rigid. However, due to this high rigidity, problems may arise. More specifically, in the conventional steering wheel, the spokes 34 have the greatest rigidity. If an impact is applied to the steering wheel in the direction indicated by arrow A in FIG. 9, the spokes 34 will not readily deform. As a result, the aforementioned impact may not be absorbed sufficiently.

In order to resolve the above-specified problems, it is conceivable to reduce the rigidity and strength of the spokes 34. In this case, however, the performance characteristics of the steering wheel itself, in ordinary use, such as the vibration characteristics or operation characteristics, will decline. As a result, the core may fail to exhibit its functions sufficiently if the rigidity and strength of the spokes 34 are reduced.

SUMMARY OF THE INVENTION

Accordingly, it is a primary object of the present invention to provide a steering wheel core which exhibits its own functions sufficiently when in normal use and adequately absorbs an impact, if applied thereto.

To achieve the foregoing and other objects and in accordance with the principles of the present invention, there is provided a steering wheel core including a ring; a boss for providing a turning center of the steering wheel; and a spoke connecting the ring and the boss. The spoke includes a portion of a lower strength than that of the remaining portions thereof such that upon impact, the lower strength portion ruptures so as to absorb the impact.

BRIEF DESCRIPTION OF THE DRAWINGS

The invention, together with objects and advantages thereof, may best be understood by reference to the following description of the presently preferred embodiments, together with the accompanying drawings, in which:

FIG. 1 is a top plan view showing a portion of the core structure of the steering wheel;

FIG. 2 is a section taken along line 2—2 of FIG. 1;

FIG. 3 is a section taken along line 3—3 of FIG. 1;

FIG. 4 is a side elevational view showing the steering wheel coupled to a steering wheel shaft; and FIG. 5 is a top plan view showing a portion of the core structure for explaining the operations when an impact is applied.

FIG. 6 is a top plan view showing a portion of the core structure of the steering wheel;

FIG. 7 is a section taken along line 7—7 of FIG. 6;

FIG. 8 is a top plan view showing a portion of the core structure for explaining the operations when an impact is applied.

DETAILED DESCRIPTION OF THE PREFERRED EMBODIMENTS

The first embodiment according to the present invention will be hereinafter described with reference to FIGS. 1 to 5.

Figure 4:
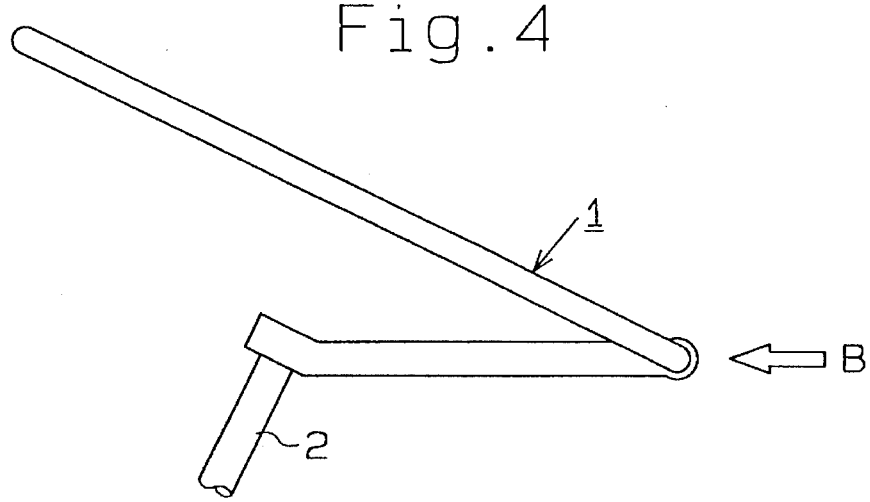

As shown in FIG. 4 a steering wheel 1 is mounted on all end of a steering shaft 2 which extends from the lower portion of a vehicle body. Moreover, the steering wheel 1 includes a core 3, as shown in FIG. 1, and a resin body (not shown) of polyurethane or the like covering the core 3.

Figure 1:
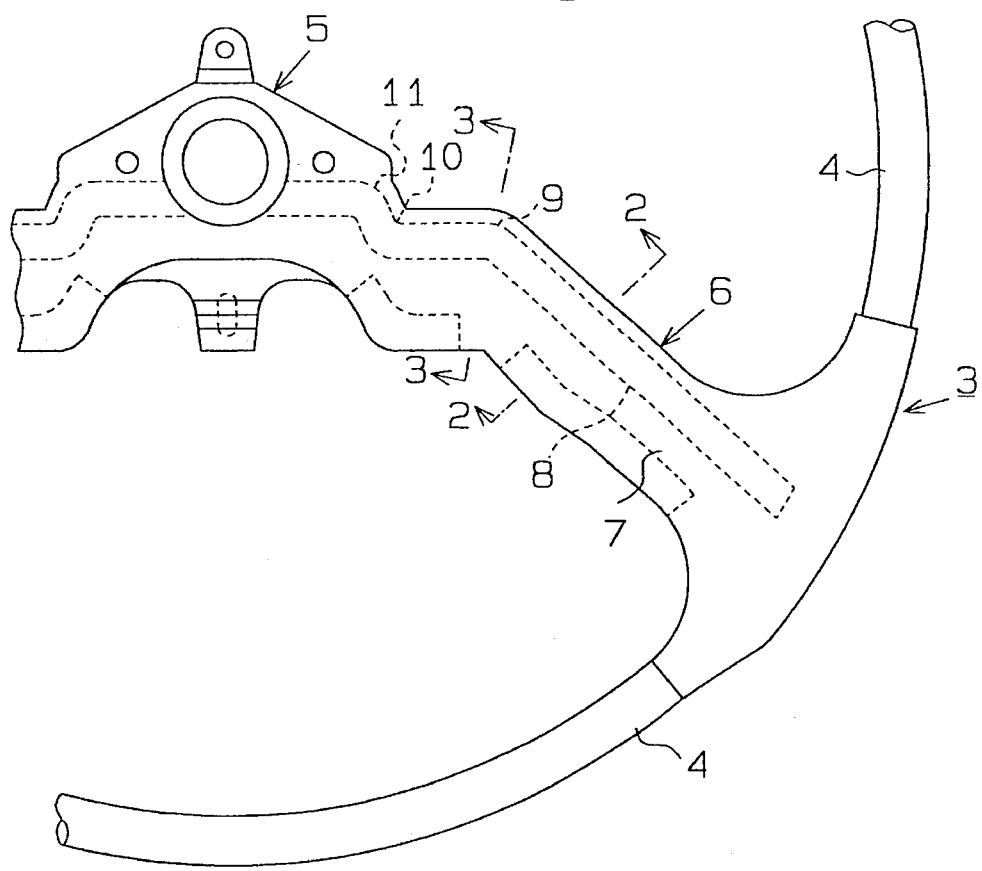
FIGS. 1 to 5 show a first embodiment of the present invention embodied into a core structure of a steering wheel for a vehicle.
Figure 2:
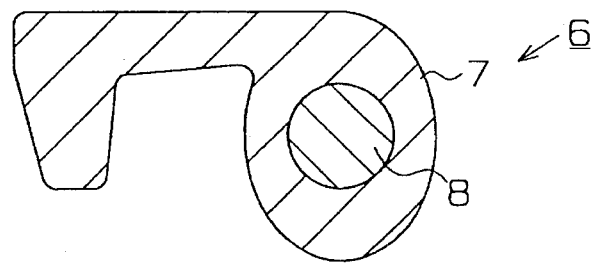
Figure 3:
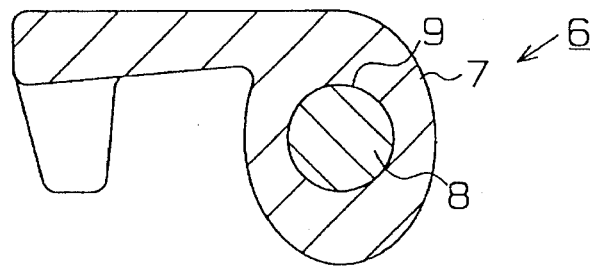

As shown in FIG. 1, the core 3 includes a ring 4, a boss 5, about which the steering wheel is rotated, and spokes 6, one which is shown, which connects the ring 4 and the boss 5. The ring 4 is preferably made of all iron pipe or any other solid material. The spoke 6 includes a cover member 7, preferably of aluminum, having a predetermined rigidity and strength. An insert 8, preferably made of iron, is embedded in the cover member 7 and has a predetermined flexibility and has a strength greater than that of the cover member 7. The cover member 7 is made by a conventional die-casting method and connected to the ring 4. In the present embodiment, moreover, the boss 5 and the spoke 6 are integrated with each other. The insert 8 embedded in the cover member 7 is disposed at the front side (as located at the upper side of FIG. 1) of the spoke. Moreover, the insert 8 is formed with three bent portions 9, 10 and 11, of which the portion closest to the ring 4 (or to the outer periphery) is a main bent portion 9. As shown in FIG. 2, the spoke 6 has a generally U-shaped cross-section near a central portion thereof. As shown in FIG. 3, the spoke 6 has an L-shaped cross-section near boss 5. In other words, the cover 7 has a reduced thickness portion near a portion thereof corresponding to the bent portion 9 of the insert 8. As a result, this portion of the cover member 7 has lower strength and rigidity than that of the remaining portions thereof, including the cover portion wherein the insert 8 is embedded. Incidentally, the reduced thickness portion is located at the back side (as located at the lower side of FIG. 1) of the spoke.

Next, the operation of the present embodiment will be hereinafter described.

In ordinary use, the cover member 7 of spoke 6 is made of die-cast rigid aluminum. This makes it possible to provide a steering wheel which exhibits sufficiently, the required functions in use, such as maintaining the proper vibration characteristics or the desired operational characteristics.

Figure 5:
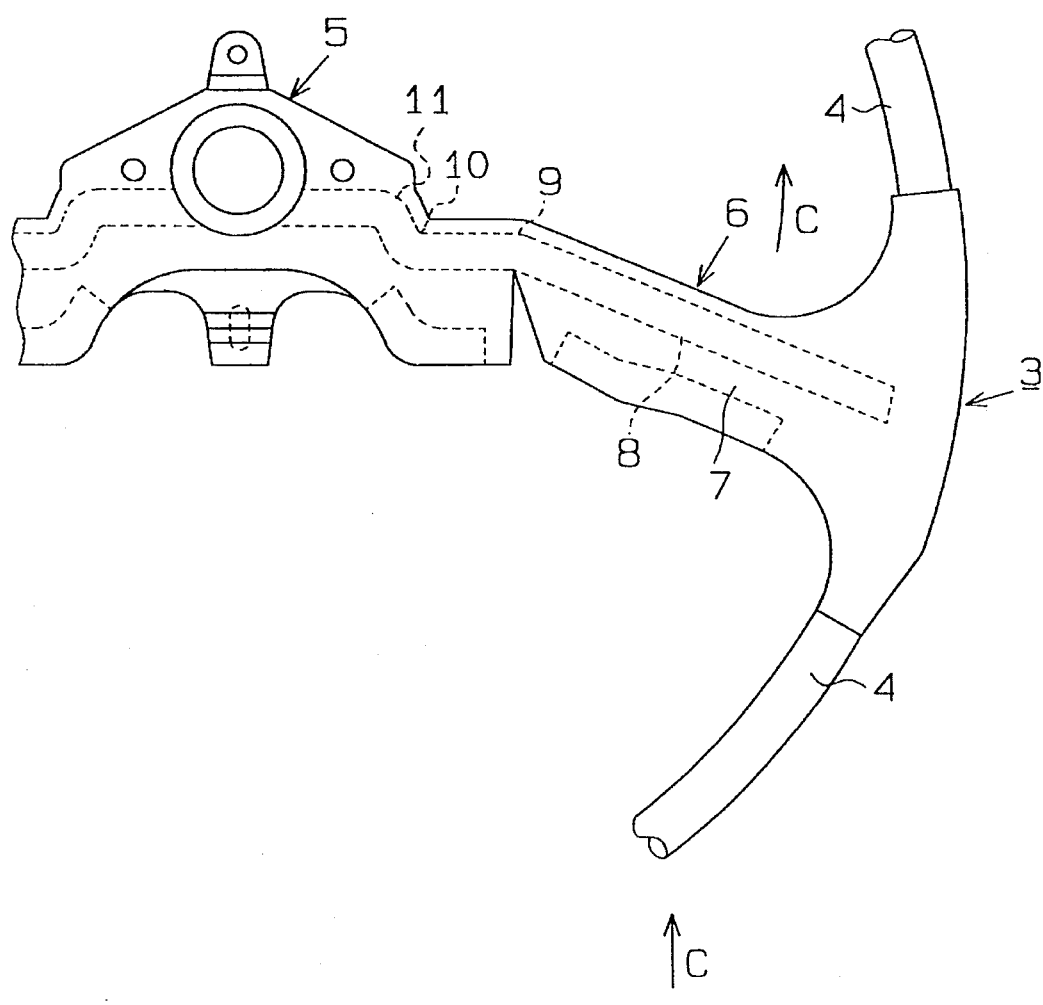

If, moreover, a forward (i.e., leftward of FIG. 4) impact is applied to the steering wheel 1, as indicated by arrow B in FIG. 4, it is transmitted, as indicated by arrow C in FIG. 5, from the resin member (not shown) to the spoke 6 through the ring 4. The cover member 7 has the reduced thickness portion, near a portion thereof corresponding to the bent portion 9, which has a strength less than that of other portions of the cover member 7. As a result, the cover member 7 ruptures near the bent portion 9, due to its reduced thickness, so that the spoke 6 is deformed to absorb the aforementioned impact. Since, at this time, the flexible insert 8 of the spoke 6 is embedded in another portion of the cover member 7, it is bent at the bent portion 9 due to the impact. As a result, the spoke 6 is prevented from rupturing in its entirety. Thus, according to the present embodiment, an impact, if applied, can be considerably absorbed. Moreover, the entire spoke 6 cannot rupture completely upon impact, preventing a safety concern which might otherwise be caused by the rupture.

Next, a second embodiment of the present invention will be described with reference to FIGS. 6 to 8. In this embodiment, the members are identical to those of the foregoing first embodiment and are designated by the same reference numerals. Thus, only the differences between the first and second embodiments will be described.

Figure 6:
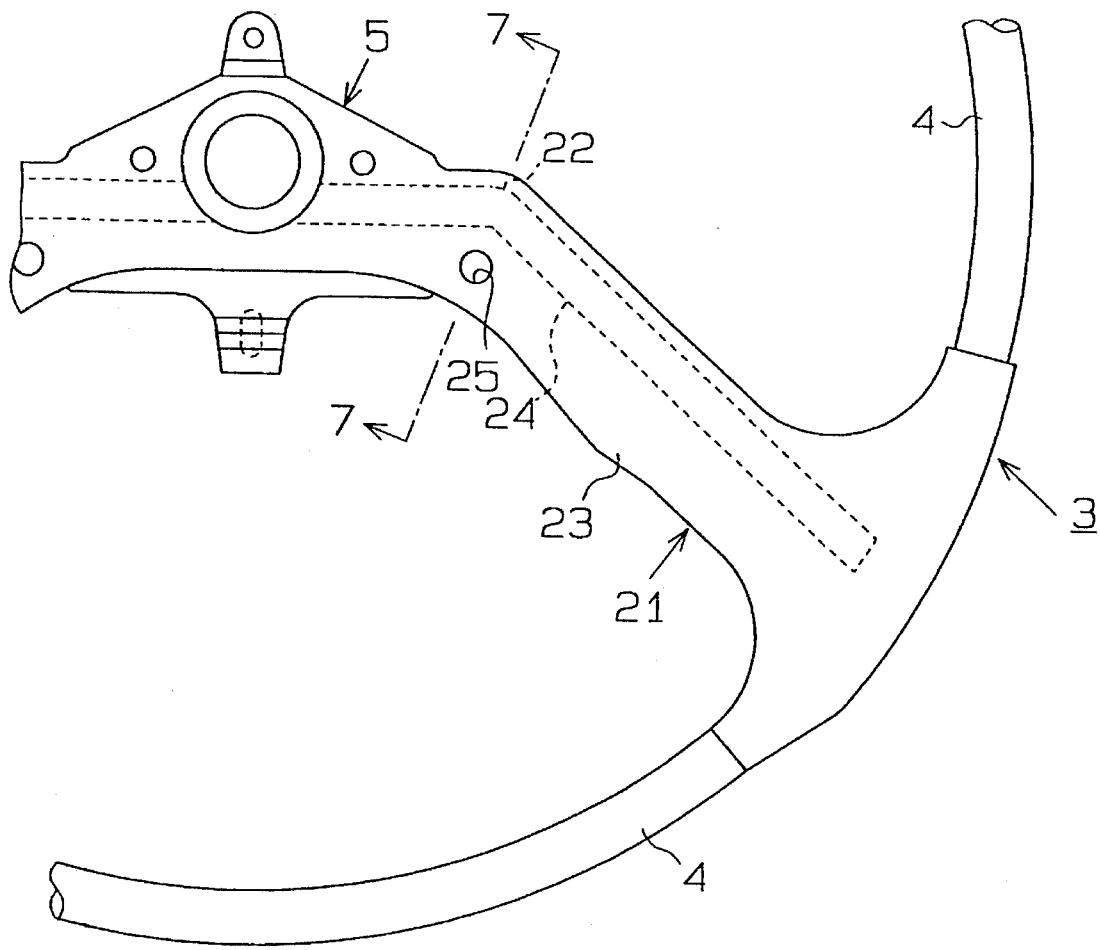
FIGS. 6 to 8 show a second embodiment of the present invention embodied into a core structure of a steering wheel for a vehicle.
Figure 7:
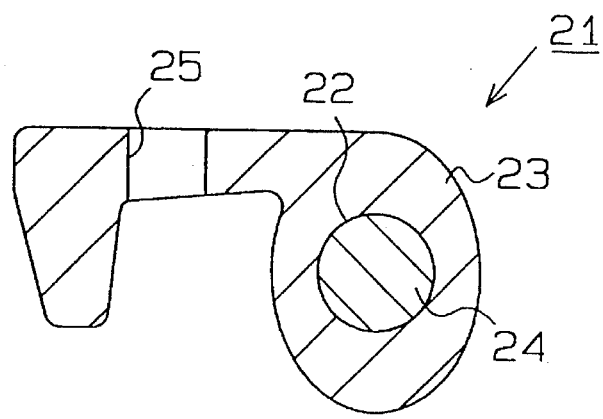

As shown in FIGS. 6 and 7, a spoke 21 is basically formed as in the foregoing first embodiment into a shape having an inverted U-section and is composed of a cover member 23 and an insert 24 embedded therein. This insert 24 is formed with a bent portion 22. As shown in FIG. 7, the spoke 21 has its cover member 23 formed with a hole 25 near a portion thereof corresponding to the bent portion 22 of the insert. As a result this portion of the cover member 23 has a lower strength than the remaining portions thereof, due to the hole 25.

Next, the operation of the present embodiment will be hereinafter described.

The same operations/effects as those of the foregoing first embodiment are achieved in ordinary use of the steering wheel.

Figure 8:
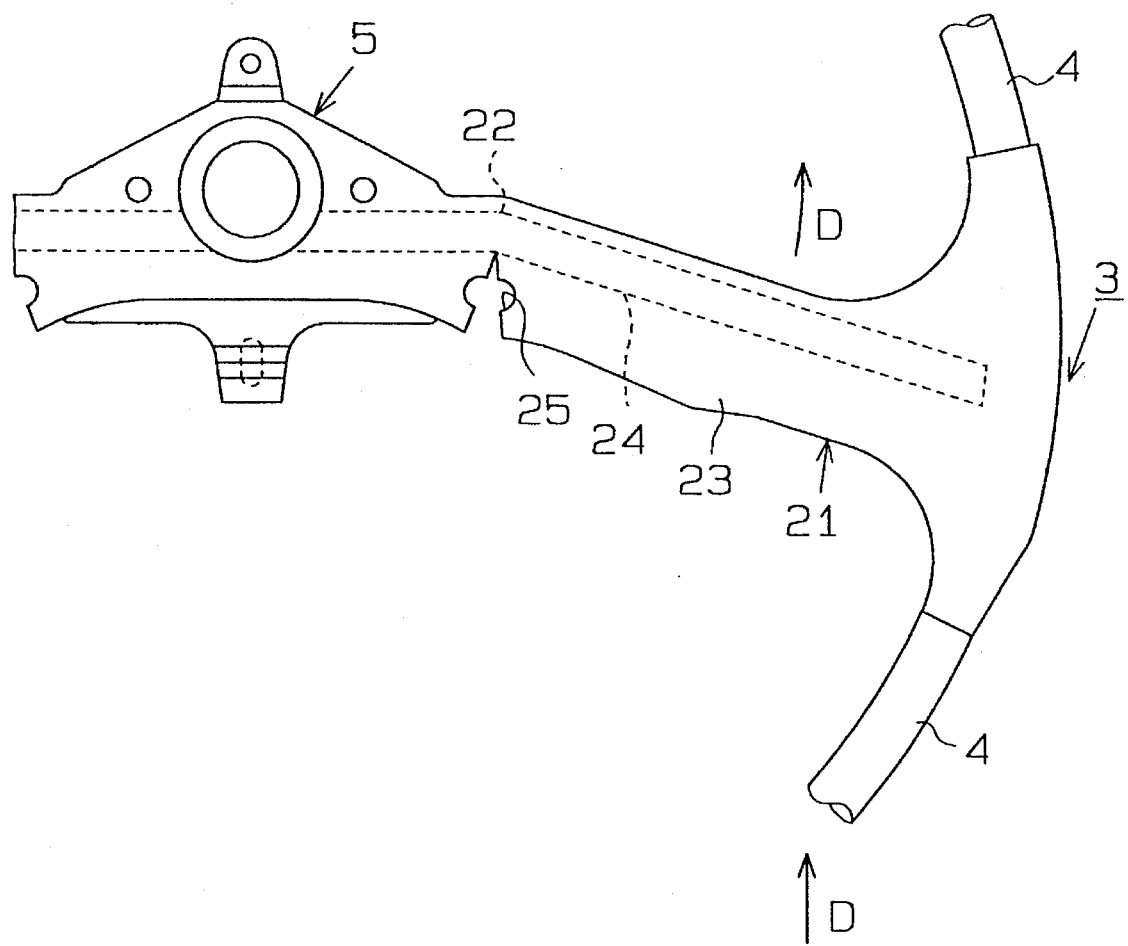
Figure 9:
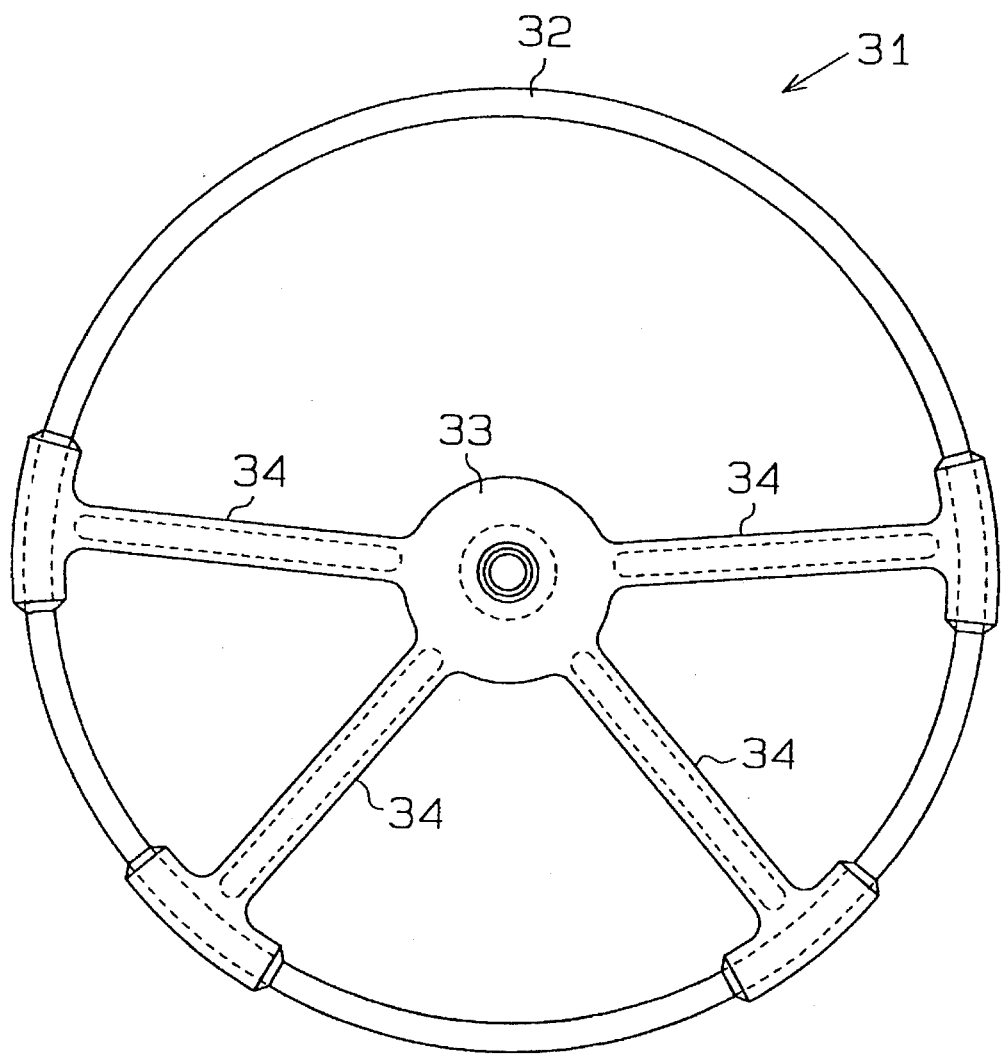
FIG. 9 is a top plan view showing the core structure of a conventional steering wheel of the prior art.

If a forward impact is applied to the steering wheel, it is transmitted from the resin member (not shown) to the spoke 21 through the ring 4, as shown by arrows D in FIG. 8. Here, it should be noted that the bent portion 22 is formed generally in the mid portion of the insert 24. Due to the hole 25 near the bent portion 22, the cover member 23 has a strength less than that of the remaining portions thereof. As a result, the spoke 21 ruptures, as shown, at the hole 25, near the bent portion 22 so that the spoke 21 is deformed to absorb the aforementioned impact. As a result, the present embodiment also achieves the effects similar to those of the foregoing first embodiment.

Although only two embodiments of the present invention have been described herein, it should be apparent to those skilled in the art that the present invention may be embodied in many other specific forms without departing from the spirit or scope of the invention. For example, it should be understood that the present invention may be embodied as follows.

In the foregoing individual embodiments, the cover members 7 and 23 are preferably made of aluminum by the die-casting method. However, the metal material to be used for making the cover member may be any metal having rigidity suitable for such application. In the foregoing individual embodiments, the insert 8 and 24 are preferably made of iron, but they may be made of any other metal such as copper, nickel or stainless steel, having a suitable flexibility.

In the first embodiment, the steering wheel core is constructed such that a thickness of the cover member 7 is reduced at its portion corresponding to the bent portion 9, and in the second embodiment, the core is constructed such that the cover member 23 is formed with the hole 25 near the bent portion 22 of the insert. Despite these constructions, however, it is sufficient that a portion of the cover member be given a lower strength that a buckling or cracking can occur to absorb an impact, if applied. Therefore, the cover member may be formed with a notch, for example near the bent portion of the insert.

Preferably, the number of bent portions is at least one. However, the construction may be modified to include two or four or more bent portions.

The present invention has been embodied in the foregoing embodiments into the steering wheel 1 for a motor vehicle but may be exemplified by a steering wheel for any movable device requiring a steering wheel.

Therefore, the present examples and embodiments are to be considered as illustrative and not restrictive, and the present invention is not to be limited to the details given herein but may be modified within the spirit and scope of the appended claims.

What is claimed is:

1. A steering wheel core comprising:

a ring member;

a boss constructed and arranged to be coupled to a shaft, about which said ring member may rotate;

at least one spoke coupling said boss to said ring member, said spoke including a cover member, a first portion of said cover member having a predetermined strength, a second portion of said cover member extending substantially along an entire length of said spoke and having a strength greater than said predetermined strength such that upon a sufficient forward impact to said steering wheel core, said first portion of said cover member ruptures and said second portion of said cover member flexes so as to absorb the impact while preventing a complete rupture of said spoke;

said second portion of said cover member including a flexible insert embedded therein, said insert including a bent portion, said first portion of said cover member being adjacent said bent portion such that as said first portion of said cover member ruptures said bent portion flexes.

2. A steering wheel core as defined in claim 1, wherein said first portion of said cover member has a thickness less than a thickness of said second portion.

3. The steering wheel core as defined in claim 1, wherein said first portion of said cover member includes surfaces defining a notch therein.

4. The steering wheel core as defined in claim 1, wherein said first portion of said cover includes surfaces defining a bore therethrough.

5. The steering wheel core as defined in claim 1, wherein said cover member is made of aluminum and said insert is made of a ferrous metal.

6. The steering wheel core as defined in claim 1, wherein said insert is disposed adjacent one side of said spoke defining said second portion of said cover member, said first portion of said cover member being disposed on a side opposite said one side so as to receive the impact.

7. The steering wheel core as defined in claim 1, wherein said boss and spoke are made integral with each other.

8. The steering wheel as defined in claim 1, wherein said second portion of said cover member has a U-shaped cross-section.

9. A steering wheel core comprising:

a ring member;

a boss constructed and arranged to be coupled to a shaft, about which said ring member may rotate;

at least one spoke coupling said boss to said ring member, said spoke including a cover member, a first portion of said cover member having a predetermined strength, a flexible insert being embedded within a second portion of said cover member and extending substantially along an entire length of said spoke, said second portion of said cover member having a strength greater than said predetermined strength such that upon a sufficient forward impact to said steering wheel core, said first portion of said cover member ruptures and said insert flexes so as to absorb the impact while preventing a complete rupture of said spoke;

said insert including a bent portion, said first portion of said cover member being adjacent said bent portion such that as said first portion of said cover member ruptures said bent portion flexes.

10. A steering wheel core as defined in claim 9, wherein said first portion of said cover member has a thickness less than a thickness of remaining portions thereof.

11. The steering wheel core as defined in claim 9, wherein said first portion of said cover member includes surfaces defining a notch therein.

12. The steering wheel core as defined in claim 9, wherein said first portion of said cover includes surfaces defining a bore therethrough.

13. The steering wheel core as defined in claim 9, wherein said cover member is made of aluminum and said insert is made of a ferrous metal.

14. The steering wheel core as defined in claim 9, wherein said insert is disposed adjacent one side of said spoke defining said second portion of said cover member, said first portion of said cover member being disposed on a side opposite said one side so as to receive the impact.

15. The steering wheel core as defined in claim 9, wherein said boss and spoke are made integral with each other.

16. The steering wheel as defined in claim 9, wherein a portion of said cover member has a U-shaped cross-section.

* * * * *